US005743940A

United States Patent [19]

Sugo et al.

[11] Patent Number: 5,743,940
[45] Date of Patent: Apr. 28, 1998

[54] PROCESS FOR PRODUCING GAS ADSORBENT

[75] Inventors: Takanobu Sugo; Jiro Okamoto, both of Gunma-ken; Kunio Fujiwara, Kanagawa-ken; Hideaki Sekiguchi, Chiba-ken; Toshiaki Fujii, Kanagawa-ken, all of Japan

[73] Assignees: Japan Atomic Energy Research Institute; Ebara Corporation, both of Tokyo, Japan

[21] Appl. No.: 264,762

[22] Filed: Jun. 23, 1994

Related U.S. Application Data

[63] Continuation-in-part of Ser. No. 996,838, Dec. 15, 1992, abandoned, which is a continuation-in-part of Ser. No. 711,601, Jun. 7, 1991, abandoned, which is a continuation of Ser. No. 328,647, Mar. 27, 1989, abandoned.

[30] Foreign Application Priority Data

Apr. 7, 1988 [JP] Japan .................... 63-85854

[51] Int. Cl.$^6$ .............. B01D 46/00; C08F 2/46; D06M 14/26; D06M 14/20
[52] U.S. Cl. .............. 95/285; 521/31; 521/32; 521/33; 442/76; 442/121; 442/170; 442/171; 522/116; 522/118; 522/120; 522/122; 522/124; 522/125; 55/524; 55/528
[58] Field of Search .............. 521/27, 29, 31, 521/32, 33; 522/122, 124, 125, 161, 157, 116, 118, 120; 95/285; 442/76, 121, 170, 171

[56] References Cited

U.S. PATENT DOCUMENTS

| | | | |
|---|---|---|---|
| 3,083,118 | 3/1963 | Bridgeford | 117/47 |
| 3,205,156 | 9/1965 | Atarashi et al. | 522/157 |
| 3,218,117 | 11/1965 | Chen et al. | 522/157 |
| 3,247,133 | 4/1966 | Chen | 521/31 |
| 3,723,306 | 3/1973 | Bridgeford | 210/22 |
| 3,933,607 | 1/1976 | Needles et al. | 522/116 |
| 3,985,501 | 10/1976 | Grot | 521/31 |
| 4,012,303 | 3/1977 | D'Agostino et al. | 521/27 |
| 4,113,666 | 9/1978 | Sano et al. | 521/29 |
| 4,157,376 | 6/1979 | Vulikh et al. | |
| 4,331,541 | 5/1982 | Akiyama et al. | 521/29 |
| 4,346,142 | 8/1982 | Lazear | 428/315.7 |
| 4,376,794 | 3/1983 | Machi et al. | 522/161 |
| 4,385,130 | 5/1983 | Molinski et al. | 521/31 |
| 4,396,727 | 8/1983 | Ishigaki et al. | |
| 4,407,846 | 10/1983 | Machi et al. | |
| 4,539,902 | 9/1985 | Hager et al. | 55/97 |
| 4,608,393 | 8/1986 | Hamano | 522/124 |
| 4,766,036 | 8/1988 | Vaughn et al. | 428/364 |
| 5,064,866 | 11/1991 | Toyomoto et al. | 521/27 |
| 5,133,864 | 7/1992 | Vaughn et al. | 210/437 |
| 5,176,833 | 1/1993 | Vaughn et al. | 210/638 |
| 5,506,188 | 4/1996 | Ohkawara et al. | 502/402 |
| 5,648,400 | 7/1997 | Sugo et al. | 521/130 |

FOREIGN PATENT DOCUMENTS

| | | |
|---|---|---|
| 014 459 | 8/1980 | European Pat. Off. . |
| 35 15 184 A1 | 11/1956 | Germany . |
| AS 12 83 538 | 11/1968 | Germany . |
| 0500032 | 4/1980 | Japan . |
| 57-073027 | 5/1982 | Japan . |
| 57-073028 | 5/1982 | Japan . |
| 62-083006 | 4/1987 | Japan . |

OTHER PUBLICATIONS

"Expapier" Catalog of Sumika Chemical Analysis Service. (undated).

Furusaki, S. et al "Development of Hollow–Fiber Filtration Membrane By Radiation–Induced Graft Polymerization", Chemical Engineering (Jul., 1987), pp. 17–20.

"Adsorption of Gases on Ion Exchange Resins" by Isao Hashida and Masato Nishimura, Kagaku No Ryoiki (The domain of Chemistry) 25–10, 1970, pp. 932–939. Partial translation.

Japanese Patent Public Disclosure No. 48–90969 partial translation.

"Adsorption of ammonia on Macroreticular ion–exchange resins" by Satsuo Kamata and Makoto Tashiro, Kogyo Kagaku Zasshi (Industrial Chemical Magazine) vol. 73–6, 1970, pp. 1083–1087. Partial translation.

"Adsorption of hydrogen chloride on porous resins with different functional groups" by Isao Hashida and Masato Nishimura, Nihon Kagaku Kaishi (Bulletin of Japan Chemistry Association, No. 3, 1985, pp. 569–571. Partial translation.

Primary Examiner—Susan W. Berman
Attorney, Agent, or Firm—Browdy and Neimark

[57] ABSTRACT

A process for producing a fabric absorbent that is capable of efficient removal of odorous substances, in particular malodorous substances. The absorbent is obtained by exposing an organic high-molecular weight compound, such as polyolefinic polymers or halogenated polyolefinic polymers, to an ionizing radiation and thereafter graft polymerizing the high-molecular weight compound with a polymerizable monomer that contains ion-exchange groups and/or a polymerizable monomer that can be converted to ion-exchange groups so as to incorporate the ion-exchange groups in the high-molecular weight compound.

40 Claims, No Drawings

PROCESS FOR PRODUCING GAS ADSORBENT

This application is a continuation-in-part, of application Ser. No. 07/996,838, filed Dec. 15, 1992 now abandoned, which is a continuation-in-part of Ser. No. 07/711,601, filed Jun. 7, 1991 now abandoned, which is a continuation of Ser. No. 07/328,647, filed Mar. 27, 1989, now abandoned.

BACKGROUND OF THE INVENTION

The present invention relates to a process for producing an adsorbent that is capable of efficient removal of odorous substances, in particular malodorous substances.

Air pollution has been studied and discussed for quite many years as one of the major problems that potentially disrupt the biological environment and aggravate the surroundings of human beings. Today, the living standard for the general public has improved and the concern of people has become directed toward maintenance and further improvement of the space around everyday life. Under these circumstances, air pollutants which were previously studied chiefly from the viewpoint of their toxicity and potential hazard to the biological environment have more recently gained a renewed interest as malodorous substances that do harm to human comfort.

As typically demonstrated by ammonia, trimethylamine and hydrogen sulfide, malodorous substances generally cause pronounced effects even if they are present in trace amounts and hence must be eliminated by efficient techniques. Several methods have been practiced to remove malodorous substances and they include: wet scrubbing that uses acidic or alkaline liquid chemicals; adsorption using an adsorbent; oxidation using a catalyst or an oxidizer; and incineration. All of these methods except adsorption are suitable for large-scale treatment of air in fairly large industrial plants but are not adapted for use in institutions or in the home. This is chiefly because large equipment is necessary and because the operations are complicated and involve the use of dangerous chemicals.

The adsorption process which uses adsorbents (activated carbon is a typical example but zeolite and alumina are also used) is easy to operate and requires less space than other methods. Because of these advantages, adsorption is a suitable method for institutional and consumer applications. However, it also has many problems to be solved. Activated carbon has long been used in particulate form. More recently, activated carbon fibers having improved adsorption capacity have been developed but these are not highly effective in eliminating polar malodorous substances such as ammonia and trimethylamine. They are the principal components of toilet odor and the smell of stale fish, which are often encountered in the home. Other adsorbents such as zeolite and alumina are unsatisfactory in adsorption rate. Special adsorbents have also been used and they are ion-exchange resins. Ion-exchange resins used for eliminating malodorous substances are of two types, cation-exchange resins and anion-exchange resins. The former type is intended to adsorb basic gases (e.g., ammonia and trimethylamine) and the latter type, acidic gases (e.g., hydrogen sulfide and hydrogen chloride). However, the ion-exchange resins available today are beaded and their use is limited to packed columns. In addition, the surface area of these resins is too small to accomplish fast reaction rates.

With a view to solving these problems associated with ion-exchange resins, gas adsorbents have been proposed that are based on a fibrous ion exchanger whose nature lends itself to a larger surface area and a faster reaction rate. In fact, however, these ion exchangers are only available in short fibers which are more like a powder and hence are very difficult to handle. In other words, the ease of molding and processing which is another feature of fibers has not been fully exploited in the prior art fibrous ion exchangers used as gas adsorbents.

SUMMARY OF THE INVENTION

An object, therefore, of the present invention is to provide a process for producing a gas adsorbent composed of a fibrous ion exchanger that can be readily molded and processed into a desired form such as a short fiber, a long fiber, a woven fabric or a nonwoven fabric.

This object of the present invention can be attained by a process in which an organic high-molecular weight compound is exposed to an ionizing radiation and thereafter ion-exchange groups are incorporated in the irradiated compound by graft polymerization.

DETAILED DESCRIPTION OF THE INVENTION

Ionizing radiations that can be used in the process of the present invention include, but are not limited to, $\alpha$-rays, $\beta$-rays, $\gamma$-rays, ultraviolet rays and electron beams, with $\gamma$-rays and electron beams being particularly suitable for the purpose of the present invention.

Organic high-molecular weight compounds that are suitable for use in the present invention include, but are not limited to, polyolefinic polymers and halogenated polyolefinic polymers having weight-average molecular weights in the range of from 100,000 to 200,000. Organic high-molecular weight compounds are preferably in fibrous form, which may be either short or long filaments. It is particularly preferred to use them in a woven or nonwoven fabric form which is a shaped article of fibers.

When the molecular weight of polyolefin is more than 500,000, since the fluidity of polyolefin is very low, it is difficult to form the polyolefin into a filament by conventional melt spinning processes. On the other hand when the molecular weight of the polyolefin is less than 50,000, a filament obtained from the polyolefin does not have sufficient strength to be useful.

After exposing organic high-molecular weight compounds to an ionizing radiation, a polymerizable monomer that either contains ion-exchange groups and/or a polymerizable monomer that can be converted to ion-exchange groups is incorporated by graft polymerization. The monomer to be brought into contact with the substrate may be in solution (liquid-phase graft polymerization) or in vapor form (vapor-phase graft polymerization). Either method can be adopted in the process of the present invention. In vapor-phase graft polymerization, the unreacted monomer remaining after completion of the reaction can be removed by merely placing the system under vacuum, so this technique has the advantage of allowing easier washing compared to liquid-phase graft polymerization. If the organic high-molecular weight compound used as a substrate is in a woven or nonwoven fabric form which is too water retentive to provide for easy washing, vapor-phase graft polymerization is economically very advantageous. In vapor-phase graft polymerization, the reaction proceeds mostly in the neighborhood of the substrate's surface, so in applications such as gas adsorption where diffusion from the surface is a rate-limiting factor, vapor-phase graft polymerization is more advantageous over liquid-phase graft polymerization in terms of the rate of gas adsorption.

Illustrative polymerizable monomers having ion-exchange groups include those having a carboxyl group such as acrylic acid and methacrylic acid, those having a sulfonic group such as sodium styrenesulfonate, and those having anion exchangeability such as arylamine or vinyl benzyl trimethyl ammonium salt. Examples of polymerizable monomers that can be converted to ion-exchange groups include acrylonitrile, acrolein, styrene, chloromethylstyrene, glycidyl methacrylate and vinylpyridine. It should, however, be noted that neither type of polymerizable monomers is limited to the examples given above. Conversion to ion-exchange groups can be effected by any known method.

From the viewpoints of adsorption rate and capacity, cation-exchange groups selected from among those which are the $H^+$ form and/or salt form of a sulfonic group, a phosphate group or a carboxyl group are preferred. Suitable anion-exchange groups are the $OH^-$ form and/or salt form of a quaternary ammonium group or a lower amino group. These ion-exchange groups may be used either singly or in combination depending on the use of the finally obtained gas adsorbent.

As described above, the process of the present invention ensures that a gas adsorbent having ion-exchange groups can be produced irrespective of whether the substrate is in a short or long fiber form. The resulting adsorbent can be easily molded and processed to make a compact deodorizer that is suitable for use in institutions or in the home. Woven and nonwoven fabrics have been used to reject fine particles by themselves and they can also be used as media that have the added ability to remove gaseous substances if ion-exchange groups are incorporated by the process of the present invention.

The following examples are provided for the purpose of further illustrating the present invention but are in no way to be taken as limiting.

EXAMPLE 1

Five grams of a nonwoven fabric (areal density, 20 g/m$^2$) made of 30 μm$^\phi$ polypropylene filaments were irradiated with 20 Mrad of accelerated electron beams. Thereafter, styrene was grafted onto the nonwoven fabric by vapor-phase polymerization to attain a graft ratio of 136%. By sulfonation with chlorosulfonic acid, a nonwoven fabric of strong acidic cation-exchange fibers having a neutral salt splitting capacity of 3.1 meq/g was obtained. This fabric was attached to a frame (40 cm×40 cm) to fabricate a filter. The filter was placed in a room (30 m$^3$) whose atmosphere was adjusted to have an ammonia concentration of 15 ppm. When the atmosphere was allowed to pass through the filter at a rate of 1 m$^3$/min, the concentration of ammonia dropped to one half the initial level in only 21 minutes.

EXAMPLE 2

Irradiation with electron beams and vapor-phase graft polymerization were conducted as in Example 1 except that chloromethylstyrene was grafted to attain a graft ratio of 115%. The nonwoven fabric was then treated with an aqueous solution of trimethylamine to introduce quaternary ammonium groups. By regeneration with a solution of sodium hydroxide, a nonwoven fabric of strong basic anion-exchange fibers having a neutral salt splitting capacity of 2.6 meq/g was obtained. This fabric was attached to a frame (40 cm×40 cm) to fabricate a filter. The filter was placed in a room (30 m$^3$) whose atmosphere was adjusted to have a HCl concentration of 20 ppm. When the atmosphere was allowed to pass through the filter at a rate of 1 m$^3$/min, the concentration of HCl dropped by half within a period of as short as 25 minutes.

EXAMPLE 3

Five grams of short polypropylene filaments (30 μm$^\phi$×1 mm$^L$) were irradiated with 20 Mrad of accelerated electron beams. Styrene was grafted onto the filaments by liquid-phase polymerization to attain a graft ratio of 153%. By sulfonation with chlorosulfonic acid, strong acidic cation-exchange fibers having a neutral salt spliting capacity of 3.3 meq/g were obtained. The fibers (0.5 g) were then packed to form a 2-cm thick bed in a glass tube having an inside diameter of 25 mm. Air containing 10 ppm of ammonia gas was passed through the bed at a rate of 1 l/min, but no detectable amount of ammonia was found in the effluent gas even after 90 hours of treatment.

In accordance with the present invention, fibrous gas adsorbents that are of various shapes and which have a variety of ion-exchange groups can be produced with great ease. These adsorbents are capable of efficient removal of trace malodorous substances and for that matter will contribute greatly to an improvement in the surroundings of human life.

EXAMPLE 4

This example illustrates the use of polyethylene as a substrate and glycidyl methacrylate as the monomer.

Five grams of a nonwoven fabric of polyethylene filaments (areal density: 50 g/m$^2$) were irradiated with 280 kGy of gamma-rays. Glycidyl methacrylate (GMA) was grafted onto the filaments by liquid-phase polymerization to attain a graft ratio of 158%. This fabric was immersed in an aqueous solution of sodium sulfite and reacted therewith at 80° C. for eight hours to produce a nonwoven fabric of strong acidic cation-exchange fibers having a neutral salt splitting capacity of 2.68 meq/g. Ten pieces of the fabric having a diameter of 20 mm each were then punched out and packed into a glass tube having an inside diameter of 20 mm. Air containing 1 ppm of ammonia gas was passed through the tube at a rate of 1 l/min, but no detectable amount of ammonia was found in the effluent gas, even after seven days of treatment.

EXAMPLE 5

This example illustrates the use of a halogenated polyolefin as a substrate and glycidyl methacrylate as the monomer.

Ten grams of a nonwoven fabric of halogenated polyethylene filaments (areal density: 60 g/m$^2$) were irradiated with 100 kGy of gamma-rays. Glycidyl methacrylate was grafted onto the filaments by liquid-phase polymerization to attain a raft ratio of 108%. This fabric was immersed in an aqueous solution containing 20% diethylamine and reacted therewith at 70° C. for three hours to obtain a nonwoven fabric of weak basic anion-exchange fibers having an ion exchange capacity of 3.02 meq/g. Ten pieces of this fabric having a diameter of 20 mm each were then punched out and packed in a glass tube having an inside diameter of 20 mm. Air containing 5 ppm of hydrogen chloride gas was passed through the tube at a rate of one liter/min, but no detectable amount of hydrogen chloride was found in the effluent gas even after three days of treatment.

EXAMPLE 6

In this example, acrylic acid was used as a monomer.

One gram of a nonwoven fabric of polyethylene filaments (areal density: 40 g/m$^2$) was irradiated with 200 kGy of gamma rays. Acrylic acid was grafted onto the filaments by gas-phase polymerization to attain a graft ratio of 73%. This fabric was a nonwoven fabric of weak acidic cation-exchange fibers having an ion exchange capacity of 5.5 meq/g. Ten pieces of the fabric, each having a diameter of 20 mm, were then punched out and packed in a glass tube having an inside diameter of 20 mm. Air containing 5 ppm of ammonia gas was passed through the tube at a rate of one liter/minute, but no detectable amount of ammonia was found in the effluent gas even after two days of treatment.

EXAMPLE 7

In this example acrylic acid and styrene sulfonate were used as monomers.

Two grams of a nonwoven fabric of polyethylene filaments (areal density: 40 g/m$^2$) was irradiated with 200 kGy of gamma rays. This fabric was immersed and grafted in an aqueous solution containing 30 weight % of acrylic acid, 10 weight % of styrene sulfonate, and 60 weight % water to obtain a nonwoven fabric of cation exchange fibers having both strong acidic ion exchange groups and weak acidic ion exchange groups with an ion exchange capacity of 5.2 meq/g and a neutral salt splitting capacity of 0.7 meq/g. Ten pieces of the fabric, each having a diameter of 20 mm, were then punched out and packed in a glass tube having an inside diameter of 20 mm. Air containing 2.3 ppm of trimethylamine was passed through the tube at a rate of one liter/minute, but no detectable amount of trimethylamine was found in the effluent gas even after two days of treatment.

EXAMPLE 8

In this example vinyl benzyl trimethyl ammonium chloride was used as a monomer.

Two grams of a nonwoven fabric of polyethylene filaments (areal density: 40 g/m$^2$) was irradiated with 200 kGy of gamma rays. This fabric was grafted in an aqueous solution containing 20 weight % of vinyl benzyl trimethyl ammonium chloride, 15 weight % of 2-hydroxyethylmethacrylate, and 65 weight % of water at 45° C. for seven hours to obtain a nonwoven fabric of strong basic anion-exchange fibers having a neutral salt splitting capacity of 1.31 meq/g. Ten pieces of the fabric, each having a diameter of 20 mm, were then punched out and packed in a glass tube having an inside diameter of 20 mm. Air containing 2.3 ppm of hydrogen chloride was passed through the tube at a rate of one liter/minute, but no detectable amount of hydrogen chloride was found in the effluent gas even after two days of treatment.

What is claimed is:

1. A process for producing a woven or nonwoven adsorbent fabric having available ion-exchange groups thereon, said fabric being capable of removing fine particles and polar gaseous substances from a gaseous atmosphere by passing the gaseous atmosphere through the adsorbent fabric, consisting essentially of:
    exposing to an ionizing radiation a woven or nonwoven fabric made from a material comprising a polyolefin; and then
    graft polymerizing onto the exposed polyolefin one or more polymerizable monomers selected from the group consisting of polymerizable monomers having ion exchange groups and polymerizable monomers that can be converted to ion exchange groups; and
    when said polymerizable monomers include ones that can be converted to ion exchange groups, converting said polymerizable monomers to ion exchange groups, wherein said craft polymerizing step and, if necessary, said converting step take place under conditions such that the resultant product is capable of removing fine particles and polar gaseous substances from a gaseous atmosphere by passing the gaseous atmosphere through the adsorbent fabric.

2. A process for producing an adsorbent fabric according to claim 1, wherein said one or more polymerizable monomers consist of polymerizable monomers having ion exchange groups.

3. A process in accordance with claim 2, wherein said polymerizable monomers are selected from the group consisting of acrylic acid, methacrylic acid, sodium styrenesulfonate, and arylamine.

4. A process for producing an adsorbent fabric according to claim 1, wherein said one or more polymerizable monomers consist of polymerizable monomers that can be converted to ion exchange groups.

5. A process according to claim 4, wherein said one or more polymerizable monomers consist of chloromethylstyrene.

6. A process in accordance with claim 4, wherein said polymerizable monomer is a glycidyl methacrylate.

7. A process for producing an adsorbent fabric according to claim 4, wherein said one or more polymerizable monomers consist of a single monomer selected from the group consisting of acrylonitrile, acrolein, styrene, chloromethylstyrene, glycidyl methacrylate, and vinylpyridine.

8. A process according to claim 1, wherein the ionizing radiation dose is about 20 mRad.

9. A process according to claim 1, wherein the polyolefin is a halogenated polyolefin.

10. A process in accordance with claim 1, wherein said graft polymerizing step takes place in the liquid phase.

11. A process in accordance with claim 1, wherein said ion exchange groups are selected from the group consisting of sulfonic groups, phosphate groups, carboxyl groups, quaternary ammonium groups, lower amino groups, and combinations thereof.

12. A process in accordance with claim 1, wherein the graft ratio of said polymerizable monomer is at least 115%.

13. A process in accordance with claim 1, wherein said ionizing radiation is electron beam or gamma-ray.

14. A process in accordance with claim 1, wherein said one or more polymerizable monomers consist of monomers selected from the group consisting of acrylic acid, methacrylic acid, sodium styrenesulfonate, arylamine, acrylonitrile, acrolein, glycidyl methacrylate and vinylpyridine.

15. A process in accordance with claim 1, wherein the neutral salt splitting capacity of said adsorbent fabric is at least 2.6 meq/g.

16. A woven or nonwoven adsorbent fabric produced by the process of claim 1.

17. A woven or nonwoven adsorbent fabric filter comprising a woven or nonwoven adsorbent fabric in accordance with claim 16 mounted onto a frame.

18. A method for removing fine particles and polar gaseous substances from a gaseous atmosphere, comprising:
    passing the gaseous atmosphere through an adsorbent fabric filter in accordance with claim 17.

19. A method for removing fine particles and polar gaseous substances from a gaseous atmosphere, comprising:
    passing the gaseous substances through an adsorbent fabric in accordance with claim 16.

20. A method in accordance with claim 19, wherein said polymerizable monomer is glycidyl methacrylate or chloromethylstyrene.

21. A method in accordance with claim 19, wherein said gaseous atmosphere is the atmosphere of a room.

22. A process in accordance with claim 1, wherein said graft polymerizing step takes place in the vapor phase.

23. A process in accordance with claim 22, wherein said graft polymerizing step includes removing the unreacted monomer remaining after said vapor phase graft polymerization reaction by placing the system under vacuum.

24. A process in accordance with claim 1, wherein said exposing, graft polymerizing and optional converting steps are conducted under conditions by which the adsorbent fabric produced thereby can permit gas to pass therethrough at a rate of at least 375 m$^3$/m$^2$ hr.

25. A woven or nonwoven adsorbent fabric produced by the process of claim 24.

26. A method for removing fine particles and polar gaseous substances from a gaseous atmosphere, comprising:

passing the gaseous substances through an adsorbent fabric in accordance with claim 25, at a flow rate of at least 375 m$^3$/m$^2$ hr.

27. A process for producing a woven or nonwoven adsorbent fabric having available ion-exchange groups thereon, consisting essentially of:

exposing to an ionizing radiation a woven or nonwoven fabric made from a material comprising a polyolefin; and then graft polymerizing onto the exposed polyolefin, a polymerizable monomer comprising glycidyl methacrylate or chloromethylstyrene; and converting said polymerizable monomer to ion exchange groups.

28. A process in accordance with claim 27, wherein said graft polymerizing step takes place in the vapor phase.

29. A process in accordance with claim 27, wherein the graft ratio of said polymerizable monomer is at least 115%.

30. A process in accordance with claim 27, wherein said ionizing radiation is electron beam or gamma-ray.

31. A woven or nonwoven adsorbent fabric produced by the process of claim 27.

32. A woven or nonwoven adsorbent fabric filter comprising a woven or nonwoven adsorbent fabric in accordance with claim 31 mounted onto a frame.

33. A method for removing fine particles and polar gaseous substances from a gaseous atmosphere, comprising:

passing the gaseous atmosphere through an adsorbent fabric filter in accordance with claim 32.

34. A method for removing fine particles and polar gaseous substances from a gaseous atmosphere, comprising:

passing the gaseous atmosphere through an adsorbent fabric in accordance with claim 31.

35. A method in accordance with claim 34, wherein said polymerizable monomer is glycidyl methacrylate.

36. A method in accordance with claim 34, wherein said gaseous atmosphere is the atmosphere of a room.

37. A method for removing fine particles and polar gaseous substances from a gaseous atmosphere, comprising:

passing the gaseous atmosphere through an adsorbent fabric made by the steps of exposing to an ionizing radiation a woven or nonwoven fabric made from a material comprising a polyolefin; and then graft polymerizing onto the exposed polyolefin, one or more polymerizable monomers selected from the group consisting polymerizable monomers having ion exchange groups and polymerizable monomers that can be converted to ion exchange groups; and when said polymerizable monomers include ones that can be converted to ion exchange groups, converting said polymerizable monomers to ion exchange groups, wherein said craft polymerizing step and, if necessary, said converting step take place under conditions such that the resultant product is capable of removing fine particles and polar gaseous substances from a gaseous atmosphere by passing the gaseous atmosphere through the adsorbent fabric.

38. A method in accordance with claim 37, wherein said polymerizable monomer is glycidyl methacrylate or chloromethylstyrene.

39. A method in accordance with claim 37, wherein said gaseous atmosphere is the atmosphere of a room.

40. A process for producing a woven or nonwoven adsorbent fabric having available ion-exchange groups thereon, said fabric being capable of removing fine particles and polar gaseous substances from a gaseous atmosphere by passing the gaseous atmosphere through the adsorbent fabric, consisting of:

exposing to an ionizing radiation a woven or nonwoven fabric made from a material comprising a polyolefin; and then graft polymerizing onto the exposed polyolefin one or more polymerizable monomers selected from the group consisting of polymerizable monomers having ion exchange groups and polymerizable monomers that can be converted to ion exchange groups; and when said polymerizable monomers include ones that can be converted to ion exchange groups, converting said polymerizable monomers to ion exchange groups, wherein said graft polymerizing step and, if necessary, said converting step take place under conditions such that the resultant product is capable of removing fine particles and polar gaseous substances from a gaseous atmosphere by passing the gaseous atmosphere through the adsorbent fabric.

* * * * *